United States Patent
Ortiz (10) Patent No.: US 9,856,944 B2
(45) Date of Patent: Jan. 2, 2018

(54) EPICYCLOIDAL GEAR TRAIN INCLUDING BUSHING-FREE PLANETARY GEAR

(71) Applicant: Luis Angel Ramirez Ortiz, Toluca (MX)

(72) Inventor: Luis Angel Ramirez Ortiz, Toluca (MX)

(73) Assignee: Robert Bosch LLC, Broadview, IL (US)

( * ) Notice: Subject to any disclaimer, the term of this patent is extended or adjusted under 35 U.S.C. 154(b) by 91 days.

(21) Appl. No.: 14/848,784

(22) Filed: Sep. 9, 2015

(65) Prior Publication Data

US 2017/0067538 A1 Mar. 9, 2017

(51) Int. Cl.

| | | |
|---|---|---|
| F16H 1/32 | (2006.01) | |
| F16H 1/20 | (2006.01) | |
| F16H 57/022 | (2012.01) | |
| F16H 1/48 | (2006.01) | |
| B60N 2/44 | (2006.01) | |
| F16H 55/17 | (2006.01) | |
| B60N 2/02 | (2006.01) | |
| F16H 1/26 | (2006.01) | |

(52) U.S. Cl.
CPC .............. F16H 1/32 (2013.01); B60N 2/4435 (2013.01); F16H 1/203 (2013.01); F16H 1/48 (2013.01); F16H 57/022 (2013.01); B60N 2002/0236 (2013.01); F16H 1/26 (2013.01); F16H 55/17 (2013.01)

(58) Field of Classification Search
None
See application file for complete search history.

(56) References Cited

U.S. PATENT DOCUMENTS

| 2,547,877 | A | * | 4/1951 | Lucia | F16H 1/2836 384/192 |
|---|---|---|---|---|---|
| 2,749,778 | A | * | 6/1956 | Kuhn | F16H 1/2809 475/344 |
| 2,861,435 | A | * | 11/1958 | Seanor | F16H 1/48 277/582 |
| 5,484,345 | A | * | 1/1996 | Fukaya | F16H 37/041 475/162 |
| 6,158,811 | A | * | 12/2000 | Hofschulte | B60N 2/0232 297/330 |

(Continued)

FOREIGN PATENT DOCUMENTS

JP 2014214834 11/2014

*Primary Examiner* — Justin Holmes
(74) *Attorney, Agent, or Firm* — Kelly McGlashen; Maginot Moore & Beck LLP (57) ABSTRACT

An epicycloidal gear assembly for use in a vehicle seat actuator includes a planetary gear that is driven by a worm gear. The planetary gear has an outer edge surface that extends between opposed sides of the gear and has a first set of external teeth, and an inner edge surface that extends between the opposed sides and defines a central opening. The worm gear includes a gear head defining a second set of external teeth, and a gear stem extending from the gear head and passing through the central opening. An outer surface of the gear stem is configured to engage the planetary gear inner edge surface in such a way as to drive the planetary gear, and the planetary gear inner edge surface defines a smooth curve between the first side and the second side.

17 Claims, 10 Drawing Sheets

(56) References Cited

U.S. PATENT DOCUMENTS

| | | | |
|---|---|---|---|
| 6,648,513 B2 * | 11/2003 | Okamoto | F16C 9/04 |
| | | | 384/192 |
| 7,081,063 B2 | 7/2006 | Hori et al. | |
| 7,387,444 B2 * | 6/2008 | Shimizu | F16C 23/041 |
| | | | 384/192 |
| 8,545,102 B2 * | 10/2013 | Hayashi | F16C 17/02 |
| | | | 29/898.043 |
| 2009/0045661 A1 * | 2/2009 | Stoessel | B60N 2/0232 |
| | | | 297/284.4 |
| 2014/0319894 A1 * | 10/2014 | Karthaus | B60N 2/0232 |
| | | | 297/463.1 |

\* cited by examiner

EPICYCLOIDAL GEAR TRAIN INCLUDING BUSHING-FREE PLANETARY GEAR

BACKGROUND

Field of the Invention

The present invention relates to a gear assembly including an epicycloidal gear arrangement suitable for use in motorized adjustment of a vehicle seat. In particular, the gear assembly includes a planetary gear having a contact surface that is shaped to reduce contact surface stress.

Description of the Related Art

Actuators are frequently used to adjust vehicle seat position. For example, a seat height adjustment actuator includes a drive motor and a gear assembly that connects the drive motor to the vehicle seat while reducing the drive motor output speed and increasing the drive motor output torque. Although such actuators are well known, they are relatively complex devices that are expensive to manufacture and assemble.

SUMMARY

In some aspects, a gear assembly includes a first gear. The first gear has a first side, a second side opposed to the first side, and an outer edge surface that extends between the first side and the second side. The outer edge surface defines a first set of external teeth. In addition, the first gear has an inner edge surface that extends between the first side and the second side and defines a central opening. The inner edge surface defines a smooth curve between the first side and the second side.

In some aspects, an actuator includes a drive motor having an output shaft and a gear assembly operatively connected to the output shaft. The gear assembly includes a first gear having a first side, a second side opposed to the first side, and an outer edge surface that extends between the first side and the second side. The outer edge surface defines a first set of external teeth. The first gear includes an inner edge surface that extends between the first side and the second side and defines a central opening. The inner edge surface defines a smooth curve between the first side and the second side.

The gear assembly and/or the actuator include one or more of the following features: The smooth curve is defined by a logarithmic function. The smooth curve is defined by an exponential function. The gear assembly includes a second gear. The second gear includes a gear head defining a second set of external teeth, and a gear stem extending from the gear head in a direction parallel to a rotational axis of the second gear and through the central opening. An outer surface of the gear stem is configured to engage the inner edge surface in such a way as to drive the first gear, and the first gear is bearing free and bushing free such that the outer surface of the gear stem directly contacts the inner edge surface. The gear stem is formed integrally with the gear head such that the second gear is a monolithic unit. The second gear is a worm gear. The gear assembly includes a housing that supports the first gear and the second gear, and the first gear is constrained by the housing to translate within a plane parallel to the first side and to be prevented from rotating about the rotational axis. The gear assembly includes a third gear and a gear shaft that extends through the third gear and is coaxial with the rotational axis. The third gear has a first end and a second end opposed to the first end, where the first end defines a third set of external teeth that serve as an output gear of the gear assembly, and the second end has a recess. A surface of the recess defines a first set of internal teeth, and the first set of internal teeth are sized and dimensioned to engage with the first set of external teeth. The gear stem includes an eccentric through opening that defines an axis parallel to, and spaced apart from, the rotational axis. The gear shaft protrudes from the second end of the third gear and is received within the gear stem through opening. In addition, the first gear is constrained by a housing to movements within a plane parallel to the first gear first side and to maintain its rotational orientation, whereby rotation of the second gear about the gear shaft results in the first gear revolving eccentrically about the longitudinal axis.

In some aspects, a gear includes a first side and a second side opposed to the first side. The gear includes an outer edge surface that extends between the first side and the second side, the outer edge surface defining a set of external teeth. In addition, the gear includes an inner edge surface that extends between the first side and the second side and defines a central opening. The inner edge surface defines a smooth curve between the first side and the second side.

The gear may include one or more of the following features: The smooth curve is defined by a logarithmic function. The smooth curve is defined by an exponential function. The gear is configured to function as a planetary gear. The inner edge surface serves as driven surface and the external teeth serve as a driving surface. The gear includes a protrusion that protrudes from the first surface. The protrusion is configured to be received within a slot formed in a facing surface of an adjacent structure, whereby the protrusion serves to constrain the motion of the gear.

Figure 15:
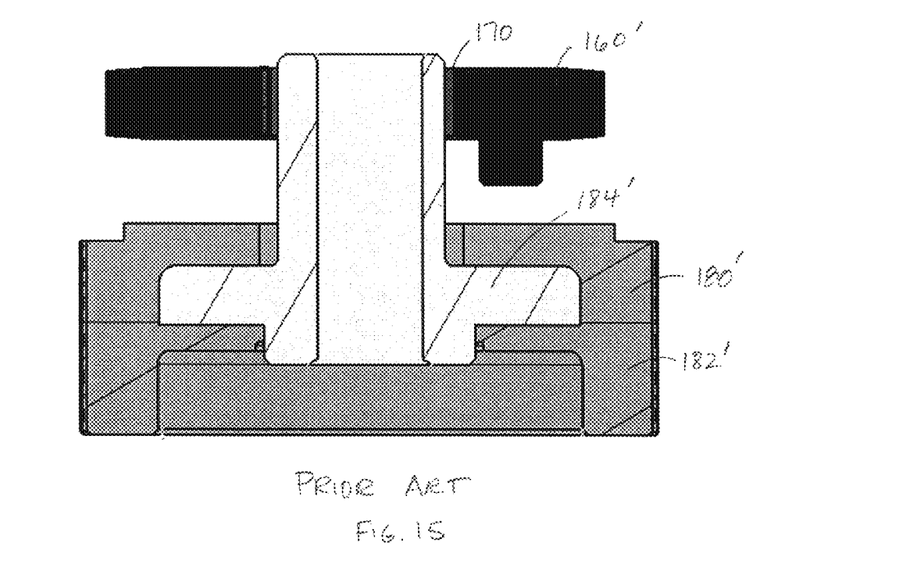
FIG. 15 is a cross sectional view of a prior art planetary gear assembled with a prior art worm gear with a bushing disposed between the gears.

In some aspects, the actuator includes an epicycloidal gear assembly in which the planetary gear is bushing-free and thus is in direct contact with an intermediate gear that drives it. Contact stresses between the planetary gear and the intermediate gear are managed by providing the planetary gear inner surface, which is the contact surface of the planetary gear, with a smoothly curved shape. By providing the planetary gear as a single-piece and including a smoothly curved contact surface (FIGS. 6, 7, 13), the planetary gear can be used without a bushing (e.g., the planetary gear is a bushing-free element). In addition, fewer parts are required and contact stress are minimized, when compared to some prior art planetary gears in which a bushing 170 is provided on an inner surface of the planetary gear 160' (FIG. 15).

In some aspects, the actuator further includes a drive gear that transmits motion to the planetary gear via the intermediate gear. The intermediate gear is a worm gear that includes a gear head (e.g., a worm wheel) that cooperatively engages a worm pinion on the output shaft of the drive motor, and a gear stem formed integrally with the gear head. By forming the gear head and gear stem together as a single part (FIG. 8), the actuator includes fewer parts when compared to some conventional actuators in which the gear head 182' is formed separately from the gear stem 184' (FIG. 15). In addition, the reliability and durability of the worm gear is improved. By forming the worm gear of plastic, the material and manufacturing costs can be reduced and durability increased relative to some conventional actuators in which the gear stem 184' is formed of sintered metal, and the gear head 182' is a plastic element overmolded on the gear stem 184'.

DETAILED DESCRIPTION

Figure 1:
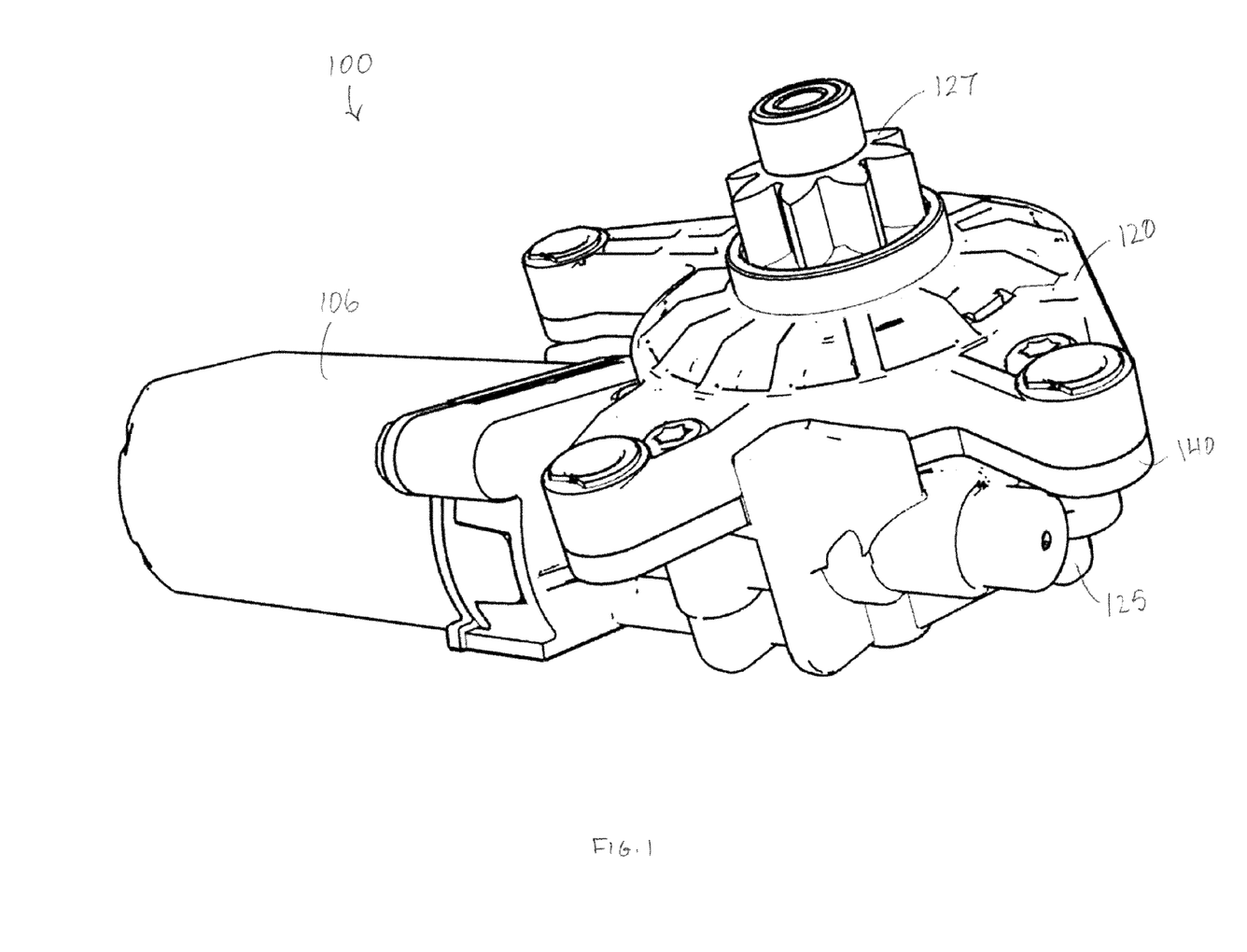
FIG. 1 is a perspective view of an actuator including an epicycloidal gear assembly.
Figure 2:
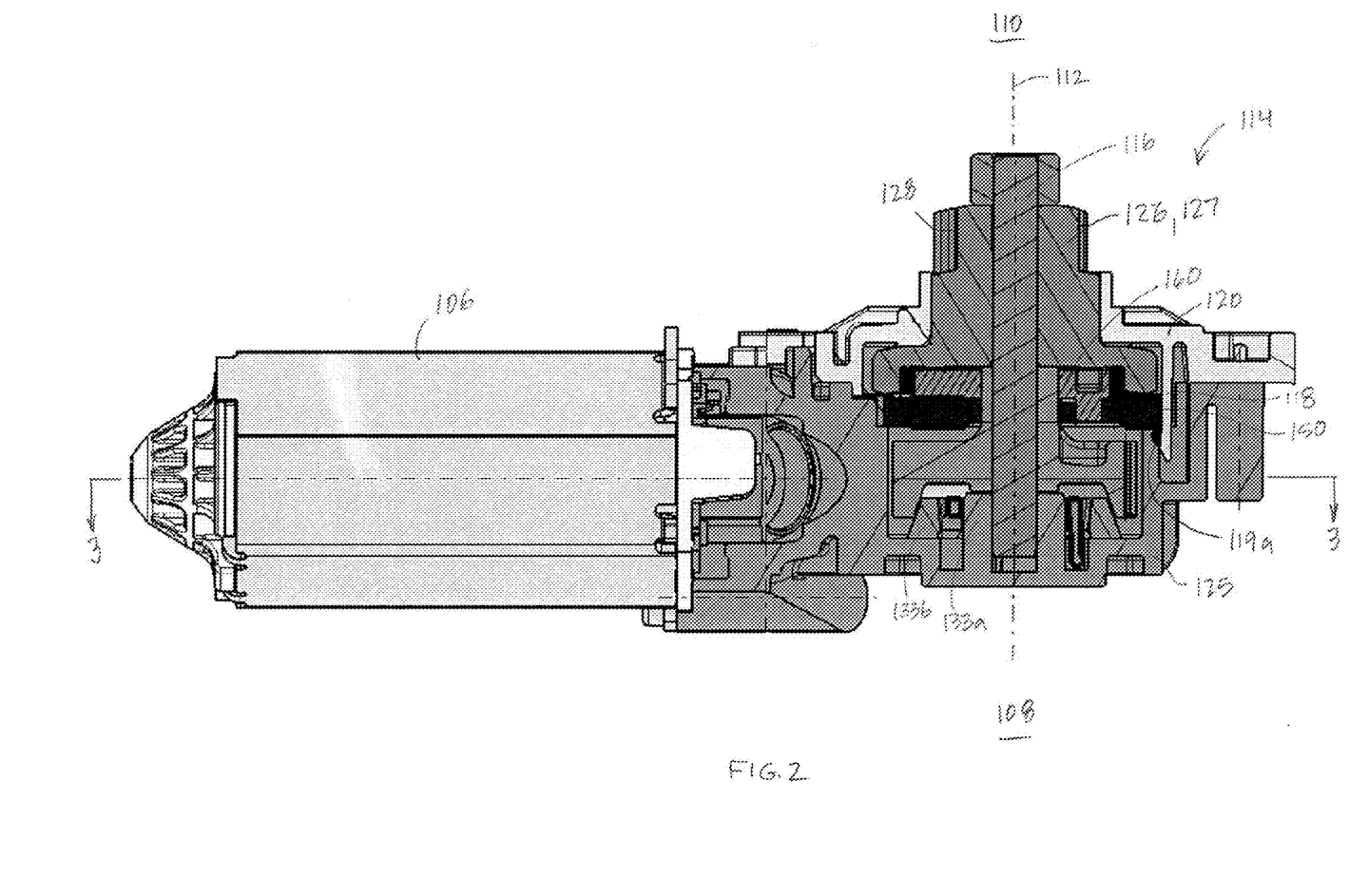
FIG. 2 is a partial side sectional view of the actuator.
Figure 3:
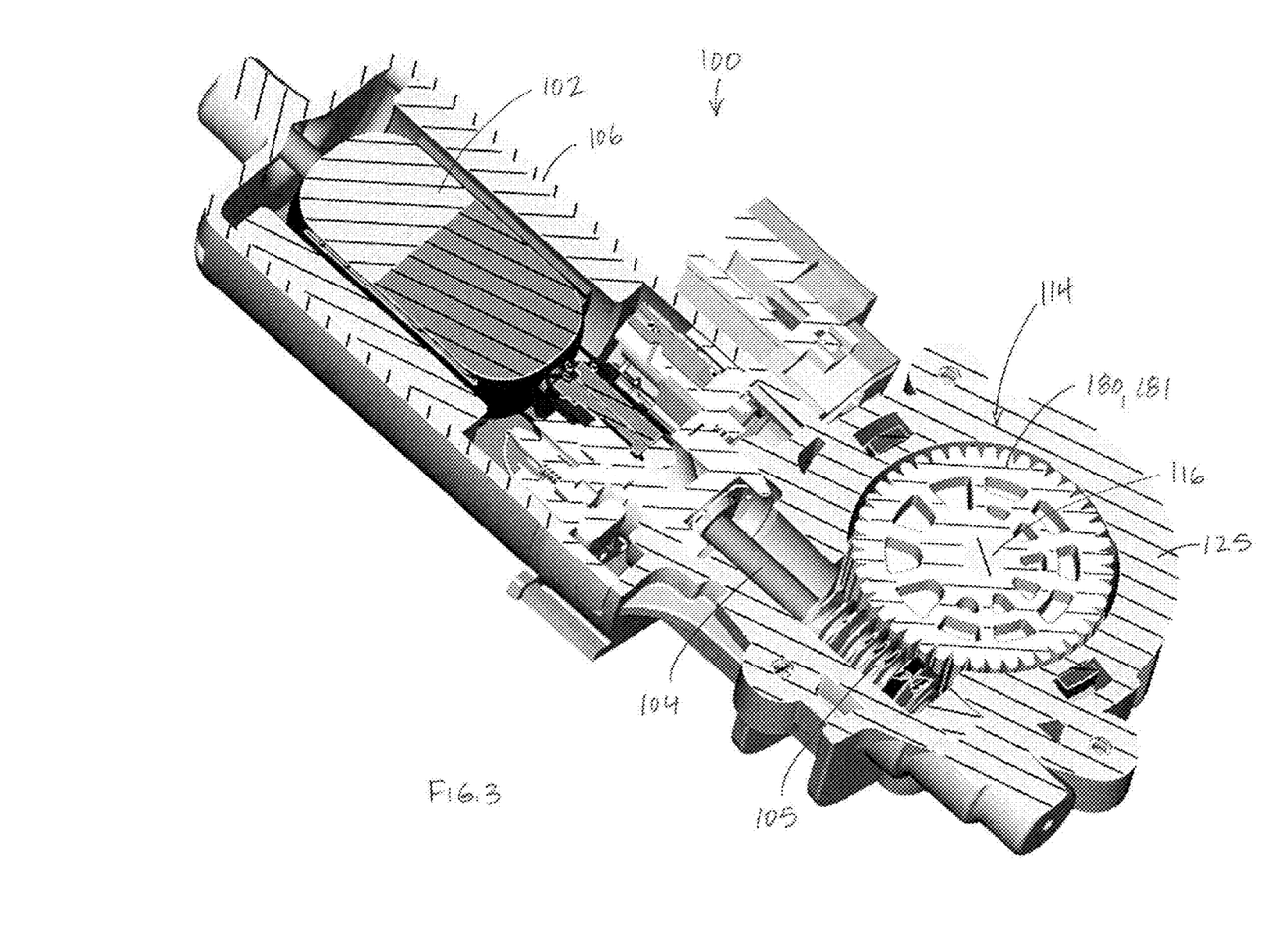
FIG. 3 is a cross sectional view of the actuator as seen along line 3-3 of FIG. 2.

Referring to FIGS. 1-3, a self-enclosed actuator 100 includes a housing 106 that supports a prime mover 102 and an epicycloidal gear assembly 114 that is coupled to the prime mover 102. The actuator 100 is of the type used, for example, to adjust the position of a vehicle seat (not shown). In use, the actuator 100 is fixed to a lateral frame member of the vehicle seat such that an output gear module 127 engages a separate toothed bracket or similar component (not shown) operative to lift and/or rotate the vehicle seat. The prime mover 102 is a drive motor such as a DC motor, and the output shaft 104 of the drive motor 102 provides an input to the gear assembly 114. The gear assembly 114 is, for example, a reduction gear assembly configured to reduce the output speed of the drove motor and/or increase the output torque of the drive motor. A remote input device (not shown), such as a push button located on the side of the vehicle seat, energizes the drive motor 102 to activate the gear assembly 114.

Figure 4:
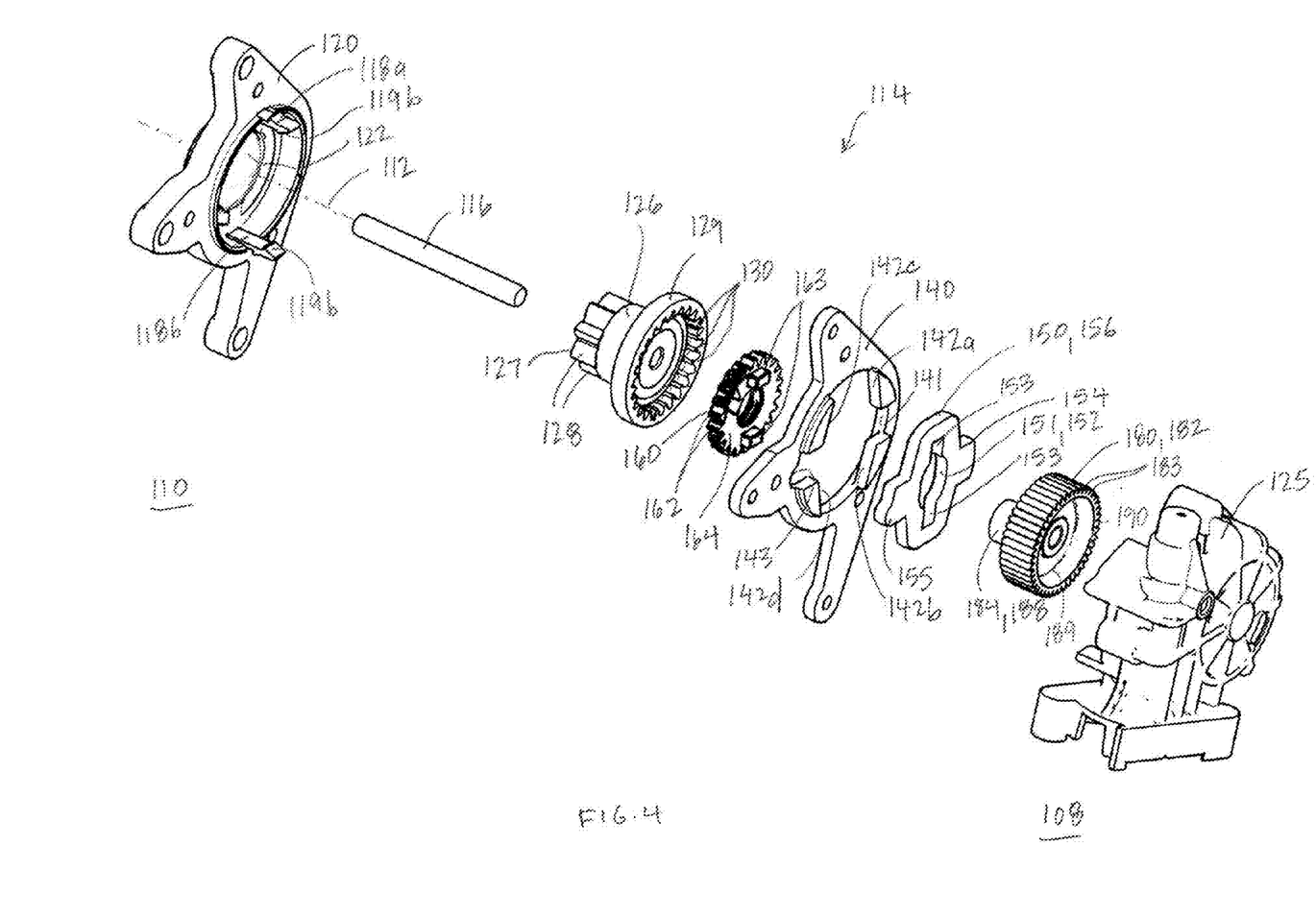
FIG. 4 is an exploded proximal perspective view of the gear assembly.
Figure 5:
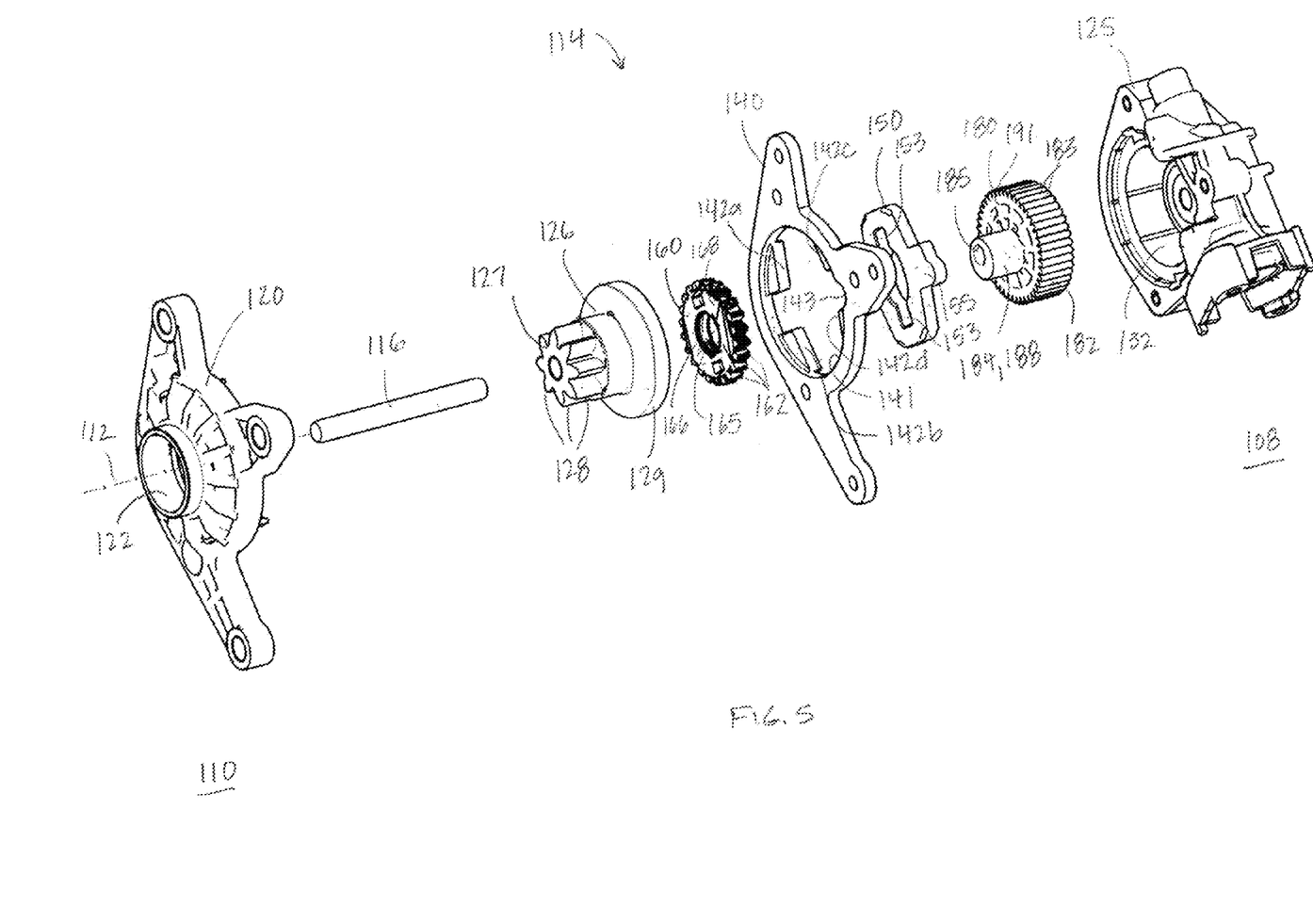
FIG. 5 is an exploded distal perspective view of the gear assembly.

FIGS. 4-5 illustrate the gear assembly 114 referenced with respect to a proximal end 108 and a distal end 110. At the distal end 110, the gear assembly 114 includes a gear cover 120 defining a recess 122 having a central axis 112. An output gear module 126 rotationally disposed about a gear shaft 116 defines the output gear 127 at a distal end having external teeth 128 and a radially larger ring gear 129 at a proximal end having internal teeth 130. A flange member 140 is mated to the gear cover 120 and defines a flange aperture 141. The flange member 140 includes four angled edges 142a, 142b, 142c, 142d, with a groove 143 formed in the circumference of the flange member aperture 141.

A fixation member 150 is disposed in the flange member aperture 141. The fixation member 150 includes an opening 151 having a centrally disposed arcuate region 152 and opposing slots 153 on either side of the arcuate region 152.

Figure 6:
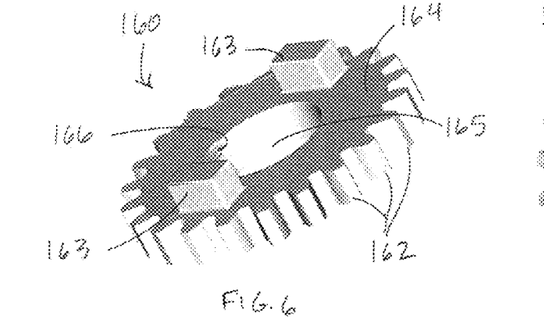
FIG. 6 is a proximal perspective view of a planetary gear of the gear assembly.
Figure 7:
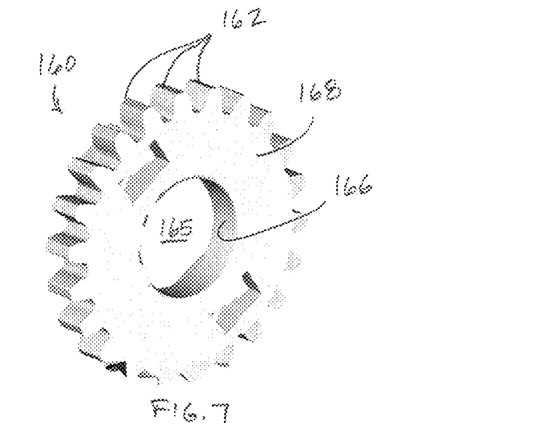
FIG. 7 is a distal perspective view of the planetary gear of FIG. 6.

Referring to FIGS. 6 and 7, a planetary gear 160 is operatively engaged with the fixation member 150. The planetary gear 160 is generally disc-shaped and includes a proximal face 164, an opposed distal face 168, and external gear teeth 162 that extend between the proximal and distal faces 164, 168. The external gear teeth 162 selectively engage internal teeth 130 of the ring gear 129 during operation. The planetary gear 160 also includes a central opening 165 that defines a tooth-free inner surface 166. Diametrically opposed blocks 163 are provided on the proximal face 164 of the planetary gear 160. The blocks 163 are received within the fixation member slots 153 and translate therein during operation of the gear assembly 114, as will be further explained below.

Figure 8:
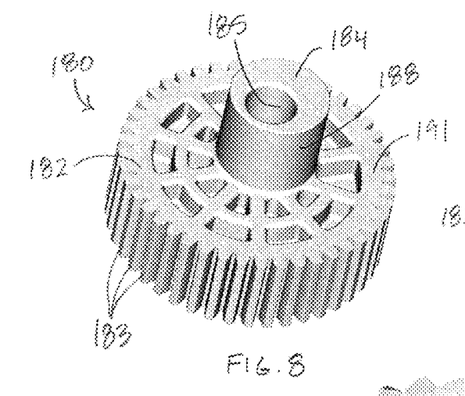
FIG. 8 is a distal perspective view of a worm gear of the gear assembly.
Figure 9:
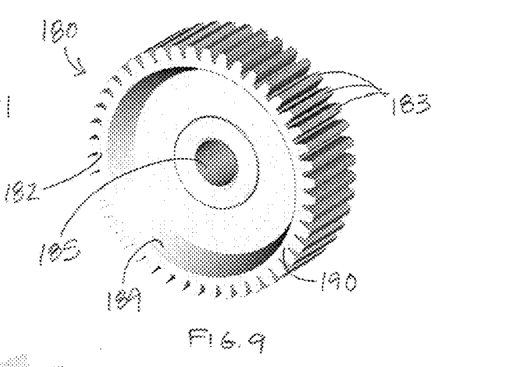
FIG. 9 is a proximal perspective view of the worm gear of FIG. 8.

Referring to FIGS. 8 and 9, a worm gear 180 includes a worm gear head 182 having external teeth 183 for engaging a worm pinion 105 coupled to an output shaft 104 of the drive motor 102. A proximal surface 190 of the worm gear head 182 is formed having a depression 189 centered on the rotational axis of the worm gear 180. The worm gear 180 also includes a worm gear stem 184 that protrudes integrally from a distal surface 191 of the worm gear head 182. The worm gear 180 includes an eccentric longitudinal through-opening 185 that extends through both the worm gear head 182 and the worm gear stem 184, and an outer surface of the worm gear stem 184 serves as an eccentric cam 188. The worm gear stem 184 extends distally through the arcuate region 152 of the fixation member 150, and engages a portion of the inner surface 166 of the planetary gear 160.

Referring to FIGS. 4-5 and 10-11, a gear housing 125 is fastened to the flange member 140 and gear cover 120 to house the above described moving components. The gear housing 125 includes a recess 132 that is configured to receive the worm gear head 182 and the worm pinion 105. A pair of annular, concentric bosses 133a, 133b protrude from the bottom of the recess 132. An inner surface of the inner boss 133a receives and supports the proximal end of the gear shaft 116. An outer surface of the outer boss 133b is received within the depression 189 formed in the worm gear head 182, whereby the outer boss 133b locates the worm gear 180 within the gear housing 125 and serves as a bearing surface during rotation of the worm gear 180.

Figure 10:
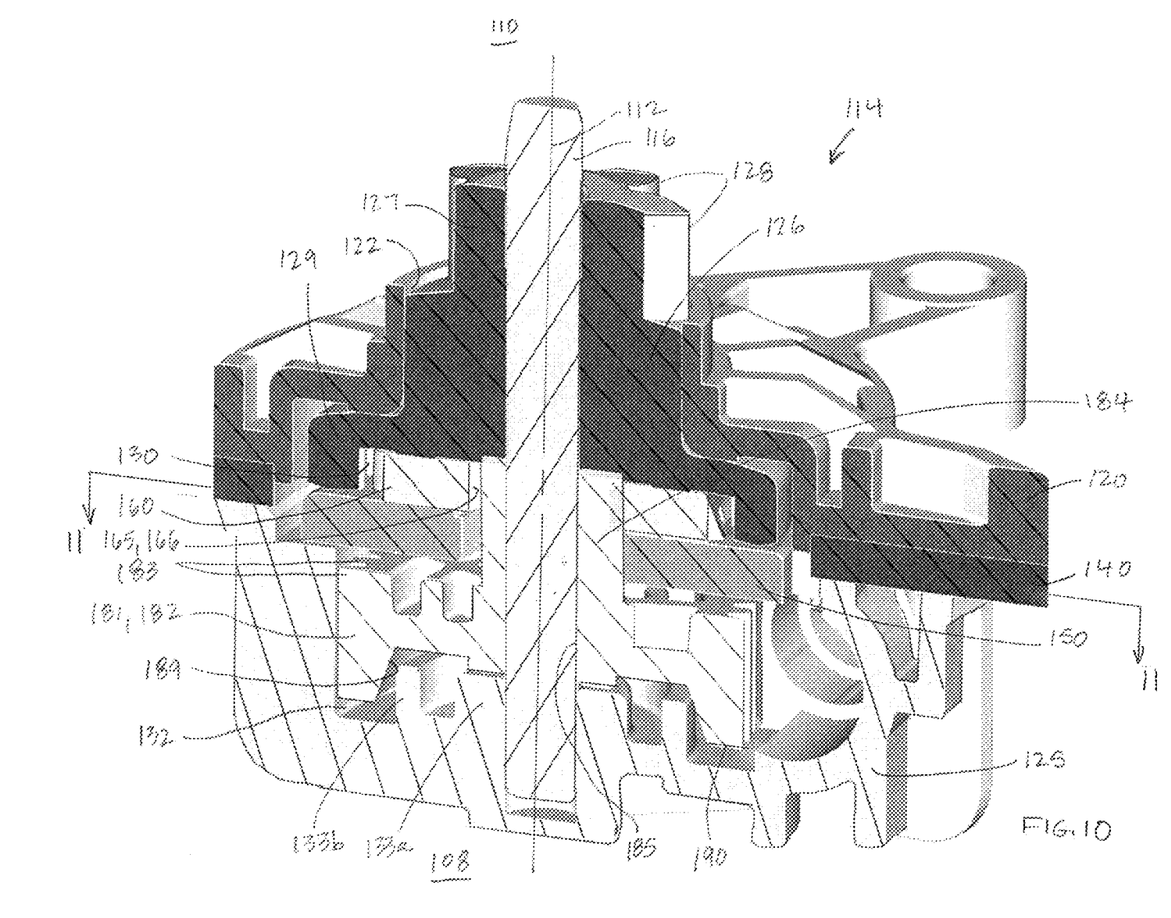
FIG. 10 is a cross sectional view of the gear assembly.
Figure 11:
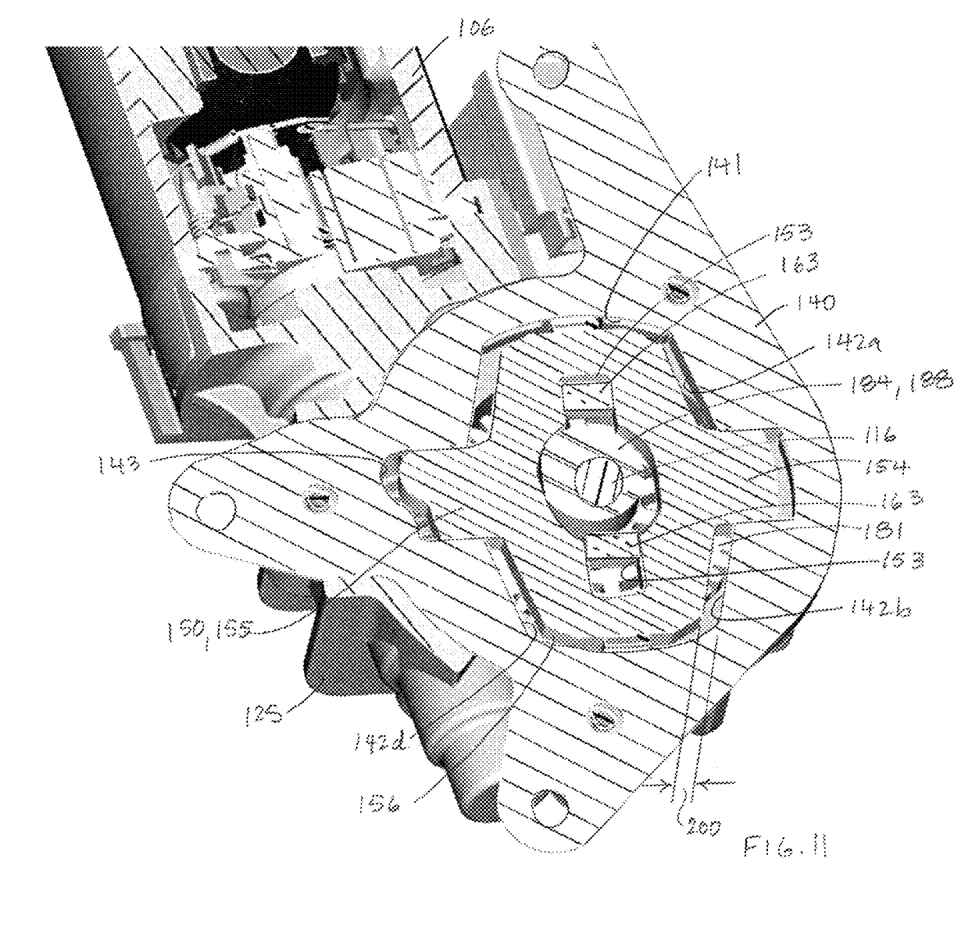
FIG. 11 is another cross sectional view of the gear assembly as seen along line 11-11 of FIG. 10.

The gear cover 120 is adjacent to the flange member 140, and the output gear module 126 is situated within the recess 122 of the gear cover 120 and the flange member aperture 141. The output gear 127 extends through the distal end of the gear cover 120 for engagement with a toothed component, as previously explained. The output gear module 126, including the output gear 127, rotates about the central axis 112.

The planetary gear 160 is disposed within the proximal end of the output gear module 126 so as to be generally surrounded by and longitudinally aligned with the ring gear 129. A portion of the external gear teeth 162 of the planetary gear 160 engage a corresponding portion of the internal teeth 130 of the ring gear 129. The planetary gear 160 is retained in longitudinal alignment with the ring gear 129 via the fixation member 150.

The fixation member 150 is positioned such that each fixation member arm 154, 155 is disposed between two adjacent angled edges 142a, 142b and 142c, 142d, respectively. A pair of retention tabs 118a, 118b extending from the gear cover 120 through the flange member aperture 141 are formed as cantilever springs with proximally disposed ramps 119a, 119b that serve to secure the fixation member 150 in a nested manner within the flange member aperture 141 (best seen in FIG. 2). The blocks 163 of the planetary gear 160 extend in a direction normal to the proximal face 164 of the planetary gear 160 and are disposed within the opposed slots 153 of the fixation member 150. The fixation member 150 is positioned within the flange member aperture 141 with respect to the four angled edges 142a, 142b, 142c, 142d such that a gap 200 exists between the outer lateral edges 156 of the fixation member 150 and the flange member 140.

The worm gear 180 is supported within the gear housing 125 such that the worm gear head 182 engages, and is driven by, the worm pinion 105 affixed to the drive shaft 104 extending from the drive motor 102 (FIG. 3). When driven by the worm pinion 105, the worm gear 180, including the worm gear head 182 and the eccentric cam 188, rotates about the central axis 112.

The eccentric cam 188 is positioned within the central opening 165 of the planetary gear 160. While the gear shaft 116 is centrally positioned and in axial alignment with the central axis 112, the gear shaft 116 is offset from the center of the eccentric cam 188.

In operation, when the seat occupant depresses the remote actuator to move the vehicle seat, the drive motor 102 energizes and rotates the drive shaft 104 and affixed worm pinion 105. The worm pinion 105 engages with and rotates the worm gear 180 including the eccentric cam 188 about the central axis 112. Rotation of the worm gear 180 concurrently rotates the gear shaft 116. The distal end of the eccentric cam 188, positioned within the central opening of the planetary gear 160, rotates about the central axis 112 with an eccentric motion by virtue of the offset. The fixation member 150, as will be explained, permits the planetary gear 160 to revolve eccentrically about the central axis 112 while maintaining its rotational orientation.

As the eccentric cam 188 drives the planetary gear 160 to revolve about the central axis 112, the blocks 163 of the planetary gear 160 cause the fixation member 150 to move. Specifically, the fixation member 150 translates laterally within the flange member aperture 141, constrained by the four angled edges 142a, 142b, 142c, 142d. The distance of translation in each direction corresponds to the gap 200. While the fixation member 150 translates back and forth in the lateral direction with the planetary gear 160, the blocks 163 of the planetary gear 160 travel within the slots 153 orthogonally to the lateral direction. In that manner, movement of the fixation member 150 in response to motion of the planetary gear 160 permits the planetary gear 160 to revolve about the axis 112 (in response to motion of the eccentric cam 188) while concurrently containing the blocks 163 within the fixation member slots 153. This, in turn, allows the planetary gear 160 to maintain its rotational orientation as it revolves about the axis 112. The combination of lateral movement of the fixation member 150 with simultaneous travel of the planetary gear blocks 163 within the slots 153 defines the revolution of the planetary gear 160 about the gear shaft 116.

Select teeth 162 of the planetary gear 160 during this revolution mesh with select internal teeth 130 of the adjacent ring gear 129. As the planetary gear 160 revolves, interaction of the teeth 162, which retain their rotational orientation throughout the revolution of the planetary gear 160, with the internal teeth 130 concentrically rotates the output gear module 126 about the central axis 112 in the same direction. This motion rotates the output gear 127 at the same angular speed and direction as the ring gear 129, thus, accomplishing a gear reduction.

As previously discussed, the output gear 127 engages a toothed bracket or like component of the vehicle seat, raising and lowering the seat upon operation. To permit back-and-forth motion, the DC motor is self-locking and reversible, allowing the user to rotate the output gear 127 clockwise or counterclockwise to raise or lower the seat as desired.

Figure 12:
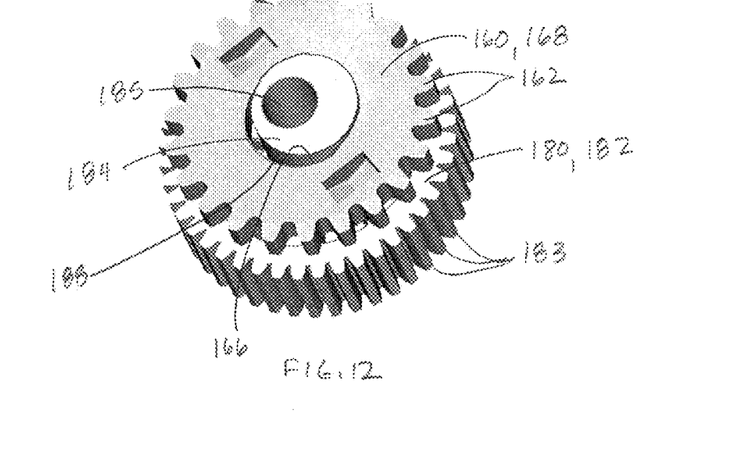
FIG. 12 is a perspective view of the planetary gear of FIG. 6 assembled with the worm gear of FIG. 8.
Figure 13:
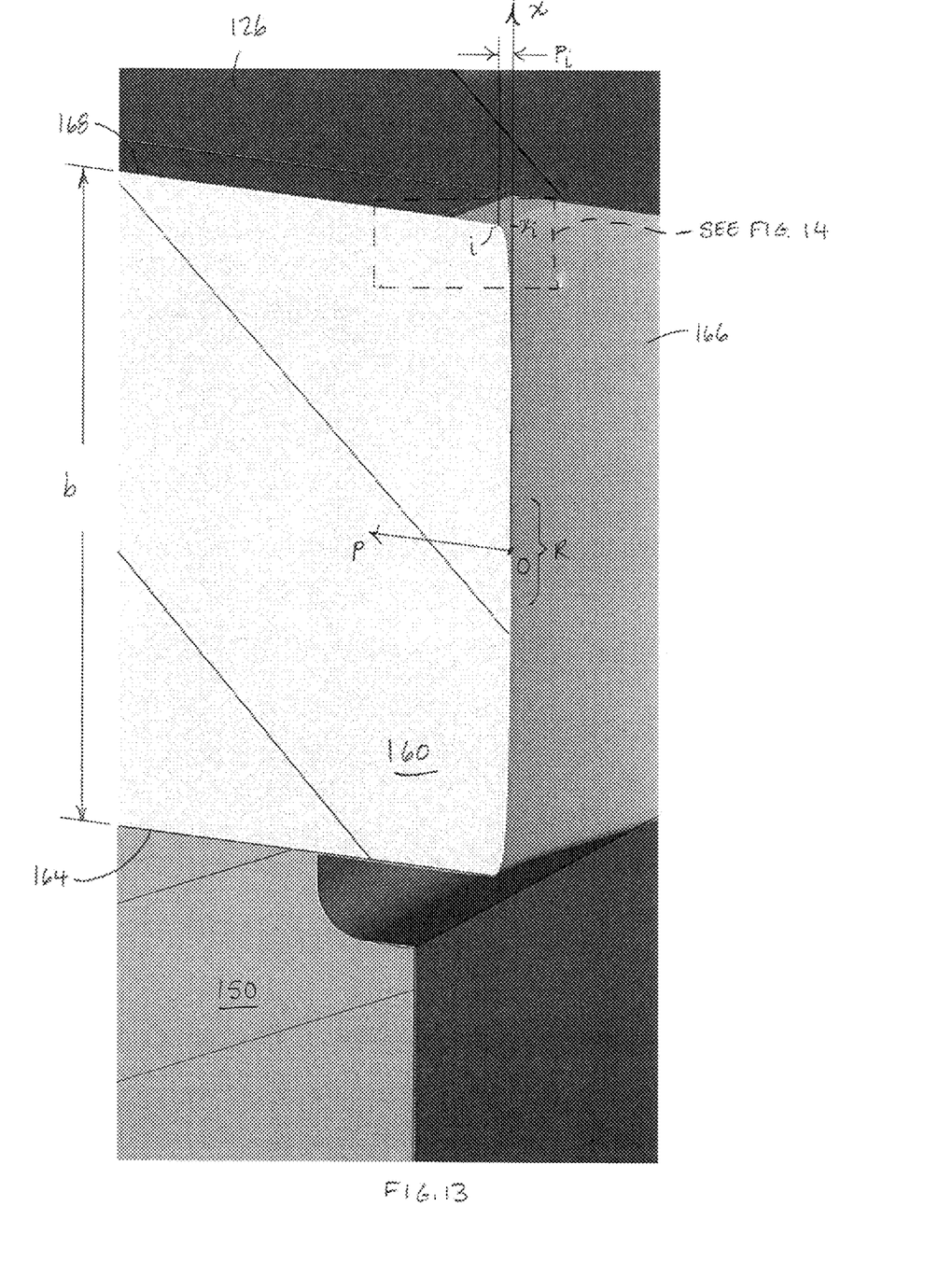
FIG. 13 is a perspective cross sectional view of an inner surface of the planetary gear of FIG. 6.
Figure 14:
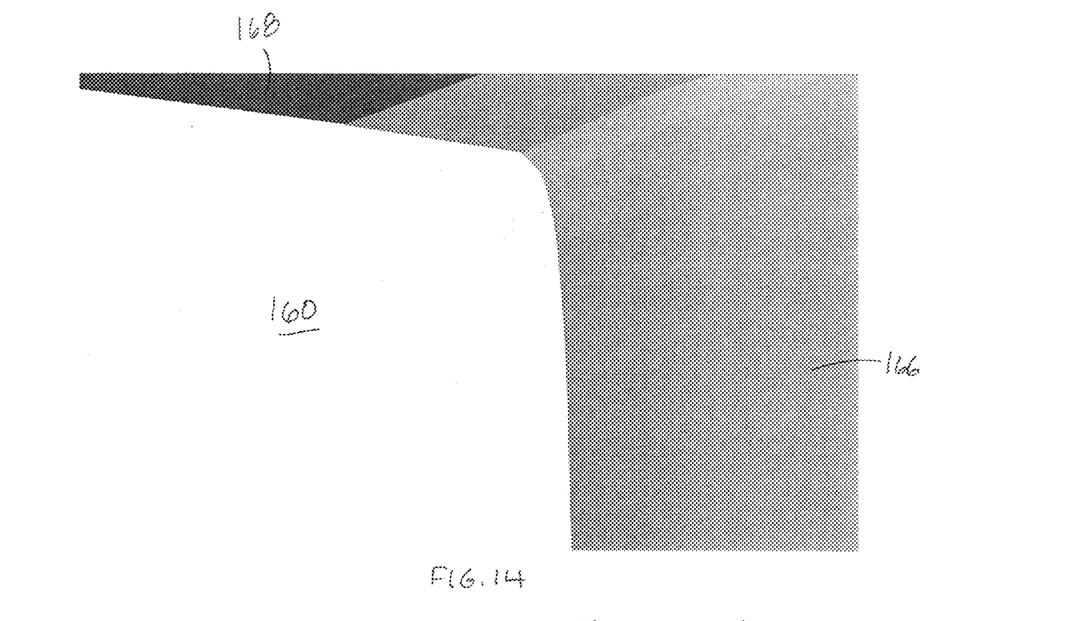
FIG. 14 is an enlarged view of the detail section identified in FIG. 13.

Referring to FIGS. 12-14, as the eccentric cam 188 drives the planetary gear 160 to revolve about the central axis 112, a portion of the outer surface of the eccentric cam 188 directly contacts a facing portion of the planetary gear inner surface 166 and applies a force thereto. In particular, the planetary gear inner surface 166 is bearing-free, whereby the costs and complexity of the planetary gear 160 and thus also the gear assembly 114 are reduced relative to some actuators that include a bearing member between the planetary gear 160 and eccentric cam 188.

Ideally, during operation, the planetary gear 160 and the fixation member 150 are constrained to reside within a plane that is transverse to the central axis 112. However, due to tolerances between respective parts, it is possible for the planetary gear 160 and fixation member 150 to tip relative to the transverse plane. In some cases, for example, the planetary gear 160 and fixation member may tip at an angle of about 1 degree. As a result, stresses are increased at the contact surface between the planetary gear inner surface 166 and the eccentric cam 188. In order to reduce stress at the contact surface, the planetary gear inner surface 166 is formed having a continuous and smooth curve that extends between the proximal and distal surfaces 164, 168. As used herein, the term "smooth curve" refers to a curve that is free of edges, corners and discontinuities.

In some embodiments, the curved shape of the planetary gear inner surface 166 is defined in terms of a logarithmic function. An exemplary mathematical expression of a logarithmic function that may be used to form the contact surface is as follows:

$$p = f(x) = \frac{a \log x}{bx + c}$$

In other embodiments, the curved shape of the planetary gear inner surface 166 is defined in terms of an exponential function. An exemplary mathematical expression of an exponential function that may be used to form the contact surface is as follows:

$$p = f(x) = ax^n + bx^{n-1} + c$$

As used in the exemplary mathematical expressions disclosed herein, p refers to the deviation from perpendicularity, and is a function of the distance x from an origin O located midway between the planetary gear proximal surface 164 and distal surface 168; x refers to a distance from origin O toward one surface, for example the distal surface 168; a is a constant that is a function of material rigidity and load; b is a constant that corresponds to the height of the planetary gear 160 (e.g., the distance between the proximal surface 164 and the distal surface 168); and c is constant corresponding to an optimized shape.

Selection of the specific function that describes the curvature of the planetary gear inner surface is made based on expected loads as well as the specific materials used to form the planetary gear 160 and the worm gear 180. In the illustrated embodiment, the planetary gear 160 is formed of a sintered metal such as sint-D39, which is a sintered steel containing cooper and nickel. The worm gear is formed of plastic such as PA66+CF20, which is nylon 66 with 20% carbon fiber. This material selection is exemplary, and the material used in a specific application will be determined by the requirements of the application.

In the embodiment illustrated in FIGS. 13 and 14, in order to minimize stress at the contact surface between the planetary gear inner surface 166 and the eccentric cam 188, the curved inner surface is formed having the shape corresponding to the following exemplary logarithmic function:

$$f(x) = a\ln\frac{1}{1-(bcx+1)^2}$$

In FIGS. 13 and 14, the value of a is 0.214, the value of b is 4.593, the value of c is 0.246, and the value of b*c is 1.13, whereby the preceding equation becomes:

$$f(x) = 0.214\ln\frac{1}{1-(1.13x+1)^2}$$

As seen in FIGS. 13 and 14, the smooth curve does not extend over the entire gear inner surface 166. In the illustrated embodiment, the planetary gear inner surface 166 is perpendicular to the opposed proximal and distal surfaces 164, 168 in a mid-height region R that extends over a relatively small portion of the planetary gear inner surface 166. For example, in some embodiments, the region R may extend in a range of about 5 percent to 50 percent of the planetary gear height b. In other embodiments, the region R may be essentially null. Although the region R may be set to extend over 100 percent of the planetary gear height b, such a configuration would require a relatively expensive high strength material to accommodate the increased stress at the contact surface between the planetary gear inner surface 166 and the eccentric cam 188.

The planetary gear inner surface 166 is not perpendicular to the opposed proximal and distal surfaces 168 outside the region R. As seen in FIG. 13, at a distance $x_i$ from the origin O, the deviation from perpendicularity p is $p_i$. Although the deviation from perpendicularity p is greatest at each of the proximal and distal surfaces 164, 168, the deviation from perpendicularity p at each of the proximal and distal surfaces 164, 168 is small relative to the planetary gear height b. For example, in some embodiments, the deviation from perpendicularity p at each of the proximal and distal surfaces 164, 168 is in a range of 1 to 5 percent of the planetary gear height b. When a logarithmic shape is used, the deviation from perpendicularity may be much greater, for example in a range of 1 to 20 percent of the planetary gear height b.

By providing a bushing-free planetary gear 160, and providing the planetary gear 160 with a smoothly curved contact surface configured to minimize contact stresses, fewer parts are required and contact stress are minimized, when compared to some prior art planetary gears in which a bushing 170 is provided on an inner surface of the planetary gear 160' (FIG. 15).

Selective illustrative embodiments of the system and device are described above in some detail. It should be understood that only structures considered necessary for clarifying the system and device have been described herein. Other conventional structures, and those of ancillary and auxiliary components of the system and device, are assumed to be known and understood by those skilled in the art. Moreover, while a working example of the system and device have been described above, the system and device are not limited to the working examples described above, but various design alterations may be carried out without departing from the system and device.

The invention claimed is:

1. A gear assembly comprising
a first gear, and a second gear that is engaged with the first gear, the first gear including
a first side,
a second side opposed to the first side,
an outer edge surface that extends between the first side and the second side, the outer edge surface defining a first set of external teeth, and
an inner edge surface that extends between the first side and the second side and defines a central opening,
wherein the inner edge surface defines a smooth curve between the first side and the second side, and
the second gear includes
a gear head defining a second set of external teeth, and
a gear stem extending from the gear head in a direction parallel to a rotational axis of the second gear and through the central opening,
wherein
an outer surface of the gear stem is configured to engage the inner edge surface in such a way as to drive the first gear, and
the first gear is bearing free and bushing free such that the outer surface of the gear stem directly contacts the inner edge surface.

2. The gear assembly according to claim 1, wherein the smooth curve is defined by a logarithmic function according to the following formula:

$$p = f(x) = \frac{a\log x}{bx+c}$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

3. The gear assembly according to claim 1, wherein the smooth curve is defined by an exponential function according to the following formula:

$$p=f(x)=ax^n+bx^{n-1}+c$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

4. The gear assembly according to claim 1, wherein the gear stem is formed integrally with the gear head such that the second gear is a monolithic unit.

5. The gear assembly according to claim 1, further comprising a third gear and a gear shaft that extends through the third gear and is coaxial with the rotational axis, the third gear having a first end and a second end opposed to the first end, wherein the first end defines a third set of external teeth that serve as an output gear of the gear assembly, and the second end has a recess, and a surface of the recess defines a first set of internal teeth, the first set of internal teeth sized and dimensioned to engage with the first set of external teeth.

6. The gear assembly according to claim 5, wherein the gear stem includes an eccentric through opening that defines an axis parallel to, and spaced apart from, the rotational axis, the gear shaft protrudes from the second end of the third gear and is received within the gear stem through opening, and the first gear is constrained by a housing to movements within a plane parallel to the first gear first side and to maintain its rotational orientation, whereby rotation of the second gear about the gear shaft results in the first gear revolving eccentrically about the longitudinal axis.

7. An actuator including a drive motor having an output shaft and a gear assembly operatively connected to the output shaft, the gear assembly comprising a first gear including
a first side,
a second side opposed to the first side,
an outer edge surface that extends between the first side and the second side, the outer edge surface defining a first set of external teeth, and
an inner edge surface that extends between the first side and the second side and defines a central opening,
wherein the inner edge surface defines a smooth curve between the first side and the second side, and the gear assembly comprises a second gear that includes
a gear head defining a second set of external teeth, and
a gear stem extending from the gear head in a direction parallel to a rotational axis of the second gear and through the central opening, wherein an outer surface of the gear stem is configured to engage the inner edge surface in such a way as to drive the first gear, and the first gear is bearing free and bushing free such that the outer surface of the gear stem directly contacts the inner edge surface.

8. The actuator according to claim 7, wherein the smooth curve is defined by a logarithmic function according to the following formula:

$$p = f(x) = \frac{a \log x}{bx + c}$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

9. The actuator according to claim 7, wherein the smooth curve is defined by an exponential function according to the following formula:

$$p = f(x) = ax^n + bx^{n-1} + c$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

10. The actuator according to claim 7, wherein the gear stem is formed integrally with the gear head such that the second gear is a monolithic unit.

11. The actuator according to claim 7, further comprising a third gear and a gear shaft that extends through the third gear and is coaxial with the rotational axis, the third gear having a first end and a second end opposed to the first end, wherein the first end defines a third set of external teeth that serve as an output gear of the gear assembly, and the second end has a recess, and a surface of the recess defines a first set of internal teeth, the first set of internal teeth sized and dimensioned to engage with the first set of external teeth.

12. The actuator according to claim 11, wherein the gear stem includes an eccentric through opening that defines an axis parallel to, and spaced apart from, the rotational axis, the gear shaft protrudes from the second end of the third gear and is received within the gear stem through opening, and the first gear is constrained by a housing to movements within a plane parallel to the first gear first side and to maintain its rotational orientation, whereby rotation of the second gear about the gear shaft results in the first gear revolving eccentrically about the longitudinal axis.

13. A gear including
a first side,
a second side opposed to the first side,
an outer edge surface that extends between the first side and the second side, the outer edge surface defining a set of external teeth, and
an inner edge surface that extends between the first side and the second side and defines a central opening,
wherein the inner edge surface defines a smooth curve between the first side and the second side, and a protrusion protrudes from the first surface, the protrusion configured to be received within a slot formed in a facing surface of an adjacent structure, whereby the protrusion serves to constrain the motion of the gear.

14. The gear according to claim 13, wherein the smooth curve is defined by a logarithmic function according to the following formula:

$$p = f(x) = \frac{a \log x}{bx + c}$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

15. The gear according to claim 13, wherein the smooth curve is defined by an exponential function according to the following formula:

$$p=f(x)=ax^n+bx^{n-1}+c$$

and wherein p refers to the deviation from perpendicularity, and is a function of the distance x from an origin located midway between the first side and the second side; x refers to a distance from the origin toward one of the first side and the second side; a is a constant that is a function of material rigidity and load; b is a constant that corresponds to the height of the first gear; and c is constant corresponding to an optimized shape.

16. The gear according to claim 13, wherein the gear is configured to function as a planetary gear.

17. The gear according to claim 13, wherein the inner edge surface serves as driven surface and the external teeth serve as a driving surface.

* * * * *